US009366893B2

(12) United States Patent  
Ha (10) Patent No.: US 9,366,893 B2
(45) Date of Patent: Jun. 14, 2016

(54) LIQUID CRYSTAL DISPLAY DEVICE (71) Applicant: LG Display Co., Ltd., Seoul (KR)

(72) Inventor: Seong-Hae Ha, Busan (KR)

(73) Assignee: LG Display Co., Ltd., Seoul (KR)

( * ) Notice: Subject to any disclaimer, the term of this patent is extended or adjusted under 35 U.S.C. 154(b) by 206 days.

(21) Appl. No.: 14/132,960

(22) Filed: Dec. 18, 2013

(65) Prior Publication Data

US 2014/0176852 A1 Jun. 26, 2014

(30) Foreign Application Priority Data

Dec. 24, 2012 (KR) .......................... 10-2012-0152246

(51) Int. Cl.
*G02F 1/1335* (2006.01)
*G02F 1/1333* (2006.01)

(52) U.S. Cl.
CPC ............ *G02F 1/133308* (2013.01); *G02F 2001/133317* (2013.01); *G02F 2201/465* (2013.01); *G02F 2201/54* (2013.01)

(58) Field of Classification Search
None
See application file for complete search history.

(56) References Cited

U.S. PATENT DOCUMENTS

| 2005/0212991 | A1 | 9/2005 | Sugawara |
| 2010/0201908 | A1 | 8/2010 | Ishida |
| 2011/0222267 | A1* | 9/2011 | Park et al. ............. 362/97.1 |
| 2012/0262855 | A1* | 10/2012 | Park et al. ........... 361/679.01 |
| 2013/0258243 | A1* | 10/2013 | Zhou ............... G02B 6/0091 349/62 |

FOREIGN PATENT DOCUMENTS

| JP | 2005-321614 A | 11/2005 |
| JP | 2012-151086 A | 8/2012 |
| KR | 10-2012-0082776 A | 7/2012 |
| TW | 200728858 A | 8/2007 |
| TW | 201229632 A | 7/2012 |

OTHER PUBLICATIONS

Japan Patent Office, Office Action, Japanese Patent Application No. 2013-254861, Sep. 2, 2014, three pages [with concise explanation of relevance in English].
European Patent Office, Search Report and Opinion, European Patent Application No. 13196368.8, May 8, 2014, five pages.

(Continued)

*Primary Examiner* — Ryan Crockett
(74) *Attorney, Agent, or Firm* — Fenwick & West LLP (57) ABSTRACT

A liquid crystal display device includes a bottom cover including a horizontal surface, and a side surface; a first guide panel coupled with the bottom cover, surrounding peripheral portions of a backlight unit using a first vertical portion, and including a first horizontal portion protruding perpendicularly toward an inner side of the first vertical portion; and a second guide panel including a second vertical portion placed right on an outer side surface of the first vertical portion, and a second horizontal portion protruding perpendicularly toward an inner side of the second vertical portion and onto a top surface of which the liquid crystal panel is fixed, wherein a rib protrudes at a top surface of the first horizontal portion, and a rib groove, into which the rib is inserted, is formed at a bottom surface of the second horizontal portion.

13 Claims, 5 Drawing Sheets

(56) References Cited

OTHER PUBLICATIONS

Taiwan Patent Office, Office Action, Taiwan Patent Application No. 102146430, Apr. 17, 2015, ten pages.

Korean Intellectual Property Office, Office Action, Korean Patent Application No. 10-2012-0152246, Jan. 14, 2014, four pages [with concise explanation of relevance in English].

* cited by examiner

FIG. 1

PRIOR ART

LIQUID CRYSTAL DISPLAY DEVICE

CROSS REFERENCE TO RELATED APPLICATIONS

The present application claims the benefit of Korean Patent Application No. 10-2012-0152246, filed in Korea on Dec. 24, 2012, which is hereby incorporated by reference for all purposes as if fully set forth herein.

BACKGROUND OF THE INVENTION

1. Field of the Invention

The present invention relates to a liquid crystal display device, and more particularly, to a liquid crystal display device having light weight, thin profile and narrow bezel.

2. Discussion of the Prior Art

A liquid crystal display device (LCD) is advantageous in displaying moving images and has high contrast ratio, and is widely used for TV, monitor or the like. The LCD displays images using optical anisotropy and polarization property of liquid crystal.

The LCD includes a liquid crystal panel having two substrates and a liquid crystal layer therebetween, and alignment direction of liquid crystal is changed by an electric field to make difference of light transmittance.

The LCD requires a light source to display images according to the difference of light transmittance of the liquid crystal panel. A backlight unit having the light source is located below the liquid crystal panel.

A CCFL (cold cathode fluorescent lamp), EEFL (external electroluminescent fluorescent lamp), LED (light emitting diode) or the like is used as the light source of the backlight unit.

Among the light sources, the LED is widely used because it has advantages such as small size, low power consumption and high reliability.

The backlight unit is categorized into a direct type and an edge type with respect to location of light source. The edge type has a structure that at least one light source is located at at least one side of a light guide plate, and the direct type has a structure that a plurality of light sources are located directly below the liquid crystal panel.

The direct type backlight unit has limit of thin profile and is thus used for an LCD when brightness is more important than thickness. The edge type backlight unit can achieve light weight and thin profile and is thus used for an LCD for laptop or the like when thickness is more important.

Figure 1:
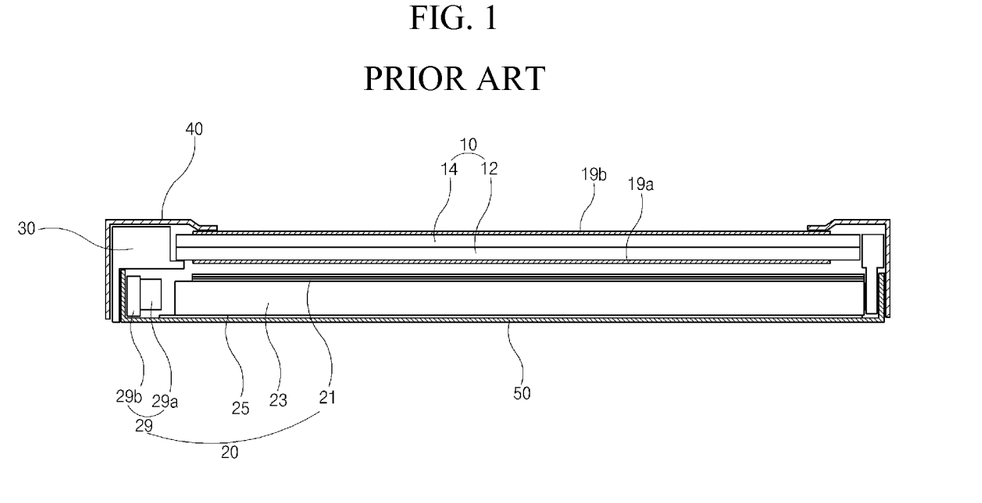
FIG. 1 is a cross-sectional view illustrating an LCD including an edge type backlight unit according to the prior art.

FIG. 1 is a cross-sectional view illustrating an LCD including an edge type backlight unit according to the prior art.

Referring to FIG. 1, the LCD includes a liquid crystal panel 10, a backlight unit 20, a guide panel 30, a bottom cover 50, and a top cover 40.

The liquid crystal panel 10 is a part playing a key role to display images and includes first and second substrates 12 and 14 attached to each other with a liquid crystal layer therebetween.

A backlight unit 20 is located below the liquid crystal panel 10.

The backlight unit 20 includes an LED assembly 29, which is arranged along a length direction of an edge of at least one side of the guide panel 30 and includes a plurality of LEDs 29a and a PCB (printed circuit board) 29b, a white or silver reflecting sheet 25 placed on the bottom cover 50, a light guide plate 23 on the reflecting sheet 25, and an optical sheet 21 on the light guide plate 23.

The liquid crystal panel 10 and the backlight unit 20 are is surrounded by the frame-shaped guide panel 30 and, in such the state, is coupled with the top cover 40 surrounding edges of a top surface at a top side thereof and the bottom cover 50 covering a bottom surface of the backlight unit 20 at a bottom side thereof, and such the components are unified by means of the guide panel 30.

The reference numbers 19a and 19b indicate polarizing plates attached to the top and bottom surfaces of the liquid crystal panel 10, respectively. LCDs are used in desktop computers, monitors, wall mount TVs as well as portable computers, and research to provide large display area and much reduction of weight and volume as well has actively progressed.

Further, the LCD is required to have not only light weight and thin profile and also large display area and small non-display area i.e., narrow bezel.

Accordingly, the case top 40 is formed as a blade type covering one edge of the liquid crystal panel 10, and the liquid crystal panel 10 is attached to and fixed to the guide panel 30 using a adhesive pad such as a double-sided tape, and thus light weight and thin profile, and narrow bezel as well is achieved.

The liquid crystal panel 10, and in more detail, the polarizing plates 19a and 19b attached to both surfaces of the liquid crystal panel 10 are shrunk and expanded due to material property thereof. However, when this phenomenon occurs, since the liquid crystal panel 10 is attached to and fixed to the guide panel 30 using the adhesive pad, deformation due to shrinkage and expansion causes the liquid crystal panel 10 to be warped, and thus light leakage of the liquid crystal panel 10 occurs.

Therefore, display quality of the LCD is degraded.

SUMMARY OF THE INVENTION

Accordingly, the present invention is directed to an LCD which substantially obviates one or more of the problems due to limitations and disadvantages of the prior art.

An advantage of the present invention is to provide an LCD that can achieve light weight, thin profile, narrow bezel, and prevent deformation due to shrinkage and expansion of liquid crystal panel i.e, polarizing plate.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device includes a liquid crystal panel; a backlight unit below the liquid crystal panel; a bottom cover including a horizontal surface, on which the liquid crystal panel and the backlight unit are placed, and a side surface perpendicular to the horizontal surface; a first guide panel coupled with the bottom cover, surrounding peripheral portions of the backlight unit using a first vertical portion, and including a first horizontal portion that protrudes perpendicularly toward an inner side of the first vertical portion; and a second guide panel including a second vertical portion which is placed right on an outer side surface of the first vertical portion, and assembled and coupled to the outer side surface, and a second horizontal portion which protrudes perpendicularly toward an inner side of the second vertical portion and having a top surface onto which the liquid crystal panel is attached and fixed, wherein a rib protrudes perpendicularly to the first horizontal portion at a top surface of the first horizontal portion, and a rib groove, into which the rib is inserted, is formed at a bottom surface of the second horizontal portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 2:
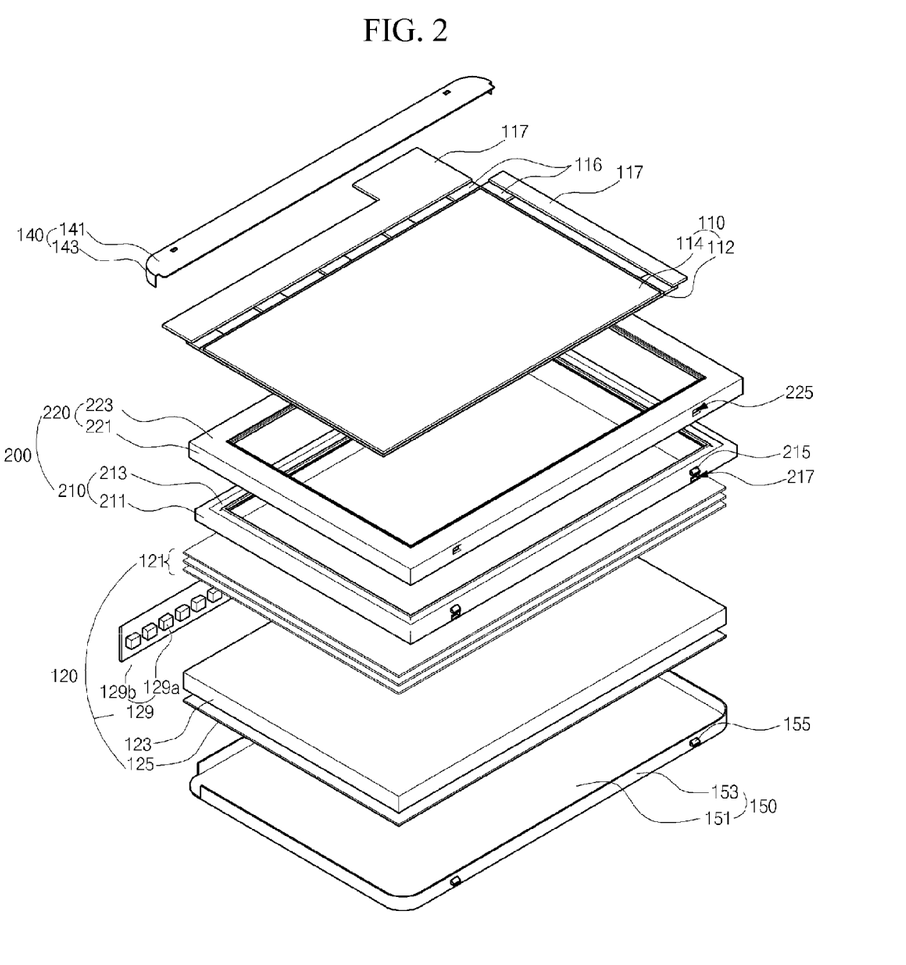
FIG. 2 is an exploded perspective view illustrating an LCD according to an embodiment of the present invention.

FIG. 2 is an exploded perspective view illustrating an LCD according to an embodiment of the present invention.

Referring to FIG. 2, the LCD includes a liquid crystal panel 110, a backlight unit 120, and mechanical components combining the liquid crystal panel 110 and the backlight unit 120, and the mechanical components includes a case top 140, a guide panel 200 of dual structure and a bottom cover 150.

Assuming that a display surface of the liquid crystal panel 110 faces the front, the backlight unit 120 is located at a back side of the liquid crystal panel 110. In a state that the liquid crystal panel 110 and the backlight unit 120 is surrounded by the guide panel 200 of double structure, the liquid crystal panel 110 and the backlight unit 120 are coupled with the case top 140 surrounding front edges of the liquid crystal panel 110 and the cover bottom 150 adhering to a bottom surface of the backlight unit 20, and such the components are unified.

The detailed explanations of the above components are as follows.

The liquid crystal panel is a component playing a key role to display images, and includes first and second substrates 112 and 114 facing and attached to each other, and a liquid crystal layer between the first and second substrates 112 and 114.

Even though not shown in the drawings, on an inner surface of the first substrate 112 referred to as a lower substrate or array substrate, gate lines and data lines cross each other to define pixels, a thin film transistor (TFT) is formed at the crossing portion of the gate and data lines and is connected to a pixel electrode in the pixel.

On an inner surface of the second substrate 112 referred to as an upper substrate or color filter substrate, red, green and blue color filters are formed in respective pixels, and a black matrix is formed surrounding each color filter and shielding the gate line, the data line and the thin film transistor. Further, a common electrode is formed covering the color filters and the black matrix.

Polarizing plates selectively transmitting specific light are attached to outer surfaces of the first and second substrates 112 and 114, respectively.

A printed circuit board 117 is connected to a peripheral portion of the liquid crystal panel 110 through a flexible circuit board or tape carrier package (TCP), and in a module process, the printed circuit board 117 is bent and appropriately placed right on a side surface of the guide panel 200 or a bottom surface of the bottom cover 150.

Regarding the liquid crystal panel 110, when a thin film transistor connected to the gate line selected by on/off signals from a gate driving circuit is turned on, a signal voltage from a data driving circuit is transferred to the pixel electrode through the data line, and an electric field between the pixel electrode and the common electrode changes alignment direction of liquid crystal molecules and thus difference of light transmittance is made.

The backlight unit 120 supplies light to the bottom surface of the liquid crystal panel 110, and thus the difference of light transmittance appears externally.

The backlight unit 120 includes a white or silver reflecting sheet 125, an LED assembly 129 as a light source arranged in a length direction of an edge at one side of the reflecting sheet 125, a light guide plate 123 placed on the reflecting sheet 125, and an optical sheet 121 placed on the light guide plate 123.

The LED assembly 129 is located at one side of the light guide plate 123 to face a light entering surface of the light guide plate 123, and includes a plurality of LEDs 129a and a PCB 129b on which the LEDs 129a are mounted and spaced apart from one another at a predetermined interval.

The LEDs 129a each includes a LED chip producing all of red, green and blue colors or white color, which emits white light to the light entering surface of the light guide plate 123. Alternatively, the LEDs 129a includes a red LED, a green LED and a blue LED, and such the red, green and blue LEDs are simultaneously turned on to mix the colors and emit white light.

The lights incident on the light guide plate 123 travel in the light guide plate 123 with several total reflections and spread evenly over a large area of the light guide plate 123, and thus surface light is supplied to the liquid crystal panel 110.

The light guide plate 123 is excellent in transparency, weatherproof and coloring property, and thus it induces spread of light when transmitting light.

The light guide plate 123 may include a specific-shaped pattern at the bottom surface to supply uniform surface light. The pattern may be formed variously like an elliptical pattern, polygon pattern, hologram pattern, or etc. to guide light incident on the light guide plate 123, and the pattern is formed at the bottom surface of the light guide plate 123 using a printing method or injection molding method.

The reflecting sheet 125 is located on the bottom surface of the light guide plate 123, and reflects light passing through the bottom surface of the light guide plate 123 toward the liquid crystal panel 110, and thus brightness of light is improved.

The optical sheet 121 on the light guide plate 123 includes a diffusing sheet and at least one light-condensing sheet, and diffuses or condenses light passing through the light guide plate 123 to supply more uniform surface light to the liquid crystal panel 110.

The optical sheet 121 may include a reflective polarizing sheet recycling linear polarized light and improving efficiency of light.

The liquid crystal panel 110 and the backlight unit 120 are modulized using the case top 130, the guide panel 200 of dual structure and the bottom cover 150. The bottom cover 150 provides a horizontal surface 151, on which the liquid crystal panel 110 and the backlight unit 120 and functions as a lower frame that supports the entire of the LCD and minimizes occurrence of light loss, and edges of the horizontal surface 151 are perpendicularly bent and become side surfaces 153.

A first coupling bump 155 is formed at an outer surface of the side surface 153 of the bottom cover 150.

A rectangular frame-shaped first guide panel 210 placed on the bottom cover 150 and surrounding the backlight unit 120 is coupled with the bottom cover 150.

The first guide panel 210 includes a first vertical portion 211 surrounding side surfaces of the backlight unit 120, and a first horizontal portion 213 that protrudes into the inner direction from the first vertical portion 211 and partially covers peripheral portions of a top surface of the backlight unit 120.

A first coupling hole 217 is formed at the first vertical portion 211, and the first coupling bump 155 is inserted into the first coupling hole 217. A second coupling bump 215 is formed on the first coupling hole 217 at the outer surface of the first vertical portion 211.

Figure 3A:
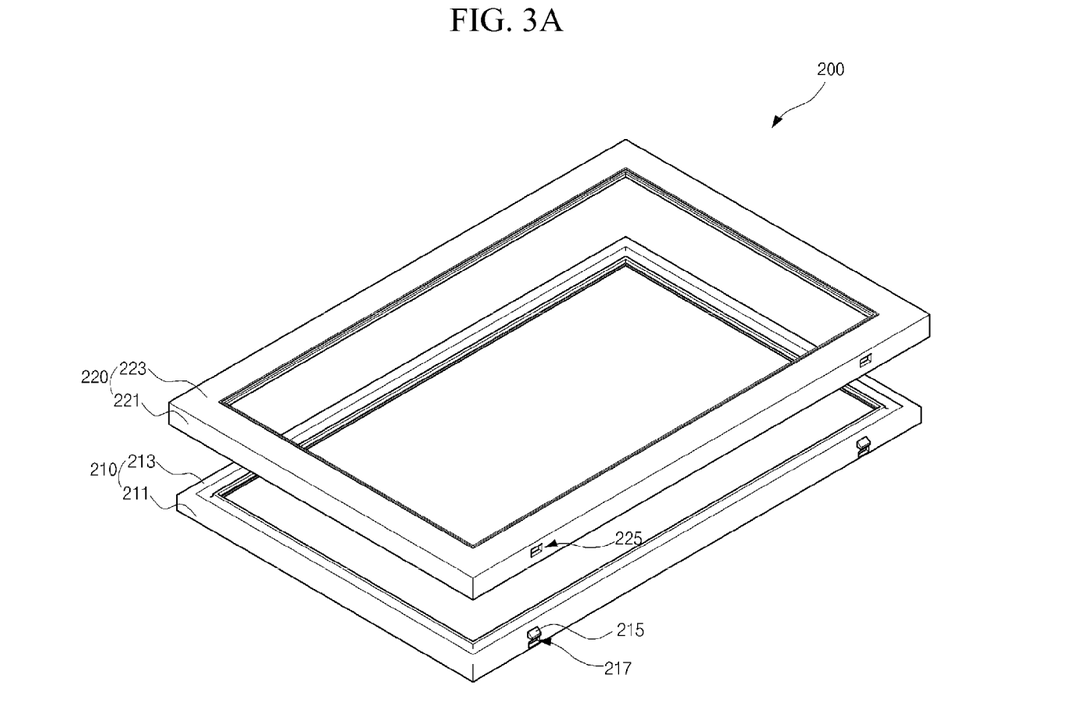
FIGS. 3A and 3B are schematic perspective views illustrating the guide panel of dual structure according to the embodiment of the present invention.
Figure 3B:
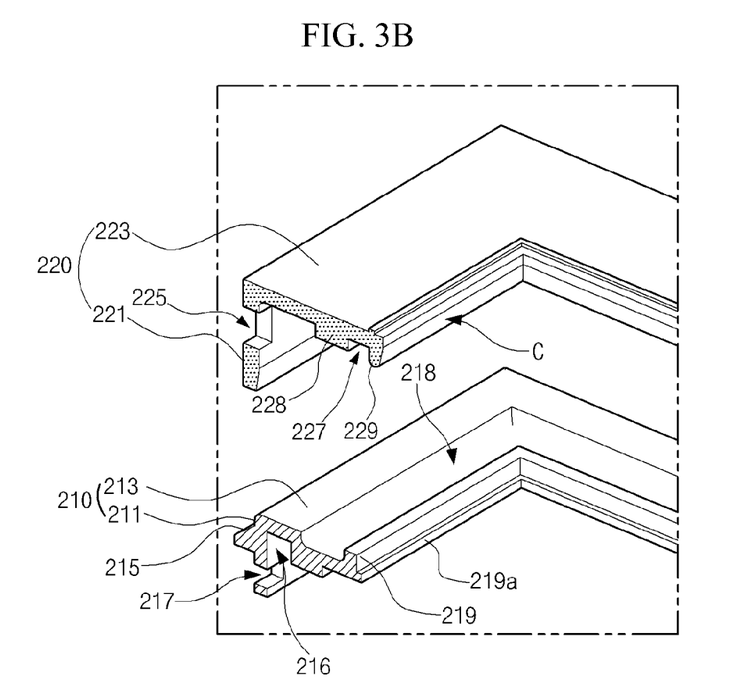
Figure 3C:
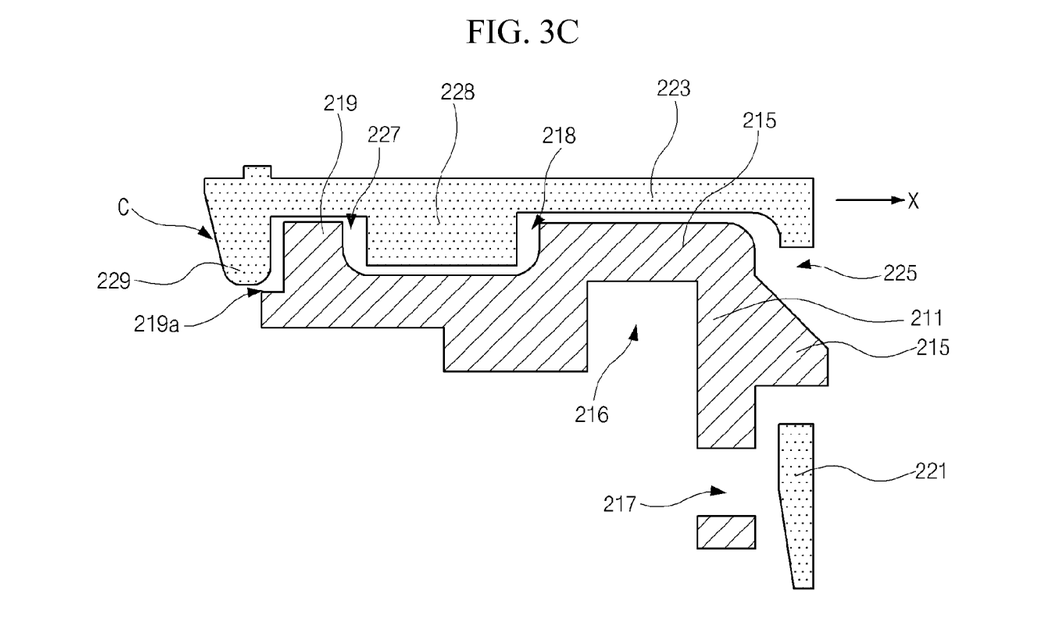
FIG. 3C is a schematic cross-sectional view illustrating a part of the first and second guide panels according to the embodiment of the present invention.

Referring to FIG. 3C, a first coupling groove 216 is formed at the bottom surface of the first horizontal portion 213 and is dent to a predetermined distance from the bottom surface of the first horizontal portion 213, and the side surface 153 of the bottom cover 150 is inserted into the first coupling groove 216. A rib 219 is formed at an end portion of the top surface of the first horizontal portion 213.

Referring back to FIG. 2, a rectangular frame-shaped second guide panel 220 is located on the first guide panel 210, has a thickness less than that of the first guide panel 210, is assembled and coupled with the first guide panel 210, and fixes the liquid crystal panel 110. The second guide panel 220 includes a second vertical portion 221 adhered to the first vertical portion 211 of the first guide panel 210, and a second horizontal portion 223 that protrudes into the inner direction from the second vertical portion 221 and is adhered to the first horizontal portion 213 of the first guide panel 210.

A second coupling hole 225 is formed at the second vertical portion 221, and the second coupling bump 215 is inserted into the second coupling hole 225. Referring to FIG. 3C, a rib groove 227 is formed at a bottom surface of the second horizontal portion 223, and the rib 219 is inserted into the rib groove 227.

Figure 4A:
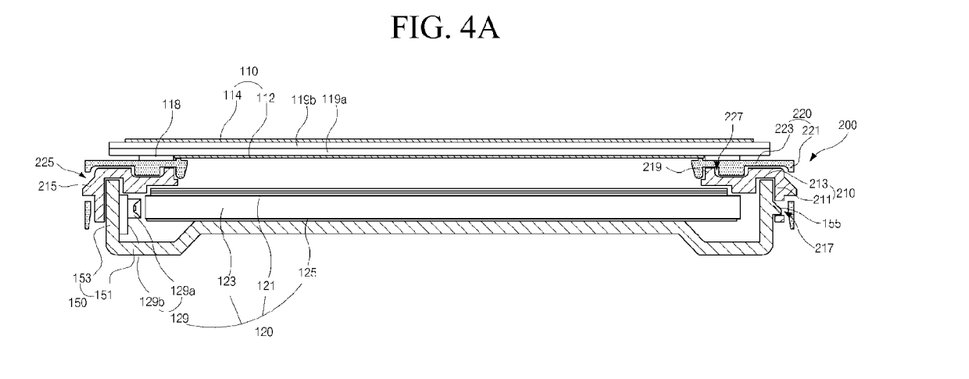
FIG. 4A is a cross-sectional view illustrating a part of the modulized LCD of FIG. 2.

Referring back to FIG. 2, the liquid crystal panel 110 is attached to and fixed to a top surface of the second horizontal portion 223 through an adhesive pad 118 (as shown in FIG. 4A).

Though the above configuration, the liquid crystal panel 110 and the backlight unit 120 are unified and modulized.

The liquid crystal panel 110 is shrunk and expanded due to material property of the polarizing plates 119a and 119b attached to both outer surfaces of the liquid crystal panel 110. However, the shrinkage and expansion can be relieved through the second guide panel 220.

The case top 140 is located in front of the liquid crystal panel 110 modulized using the bottom cover 150 and the guide panel 200 of double structure, and functions to protect and shield a driving circuit formed at a peripheral portion of the liquid crystal panel 110.

The case top 140 corresponds to one peripheral portion of the bottom cover 150, and is formed to have a blade type such that it covers a top surface of one peripheral portion of the liquid crystal panel 110 and the outer surface of the side surface 153 of the bottom cover 150.

In other words, the case top 140 includes a first peripheral portion 141 covering the top surface of the peripheral portion of the liquid crystal panel 110 and a second peripheral portion 143 perpendicular to the first peripheral portion 141 and covering the outer surface of the side surface 153 of the bottom cover 150, and the case top 140 is assembled and coupled with the bottom cover 150.

As described above, the case top 140 is formed corresponding to the one peripheral portion of the liquid crystal panel 110, and thus a light weight, thin profile, narrow bezel, and simplification of process can be achieved.

The modulization process is explained in more detail as follows. The first guide panel 210 is coupled with the second guide panel 220 in a state that the first guide panel 210 surrounds peripheral portions of the backlight unit 120. The outer side surface of the first vertical portion 211 of the first guide panel 210 is placed right on the inner side surface of the second vertical portion 221 of the second guide panel 220, and the second coupling bump 215 of the outer side surface of the first vertical portion 211 is inserted into the second coupling hole 225 of the second vertical portion 221 of the second guide panel 220, and thus the first and second guide panels 210 and 220 are assembled and coupled.

The coupled first and second guide panels 210 and 220 are placed on the bottom cover 150. The inner side surface of the first vertical portion 211 of the first guide panel 210 contacts the outer side surface of the side surface 153 of the bottom cover 150, and the first coupling bump 155 of the outer side surface of the side surface 153 of the bottom cover 150 is inserted into the first coupling hole 217 of the first vertical portion 211 of the first guide panel 210, and thus the first and second guide panels 210 and 220 are assembled and coupled with the bottom cover 150.

The liquid crystal panel 110 is attached and fixed onto the top surface of the second horizontal portion 223 of the second guide panel 220 using the adhesive pad 118 such as a double-sided tape, and then the case top 140 is assembled and coupled at the front of one peripheral portion of the liquid crystal panel 110, and thus the modulization of the LCD is finished.

Therefore, the liquid crystal panel 110 and the backlight unit 120 can be stably modulized.

In the LCD of the embodiment, the guide panel 200 is configured to have the double-structure of the first and second guide panels 210 and 220, the first and second guide panels 210 and 220 are coupled with the bottom cover 150 using the first guide panel 210, and the liquid crystal panel 110 is attached and coupled using the second guide panel 220. Accordingly, the guide panel 200 of double structure and the bottom cover 150 can be coupled with stable coupling force, the shrinkage and expansion of the liquid crystal panel 110 due to the material property of the polarizing plates 119a and 119b can be relieved.

In other words, in case that the liquid crystal panel is attached onto the guide panel using the adhesive pad such as a double-sided tape, when the polarizing plates are shrunk and expanded, the liquid crystal panel warps because the liquid crystal panel is bound by the adhesive pad, and thus light leakage occurs.

To prevent this problem, the guide panel, to which the liquid crystal panel is attached and fixed, may be formed to have movability such that the shrinkage and expansion of the liquid crystal panel i.e., the polarizing plates is relieved. However, in this case, it is difficult to stably couple the liquid crystal panel and the backlight unit, and thus movement of the light guide may be caused, and this may cause damage on the LED.

In this embodiment, the first guide panel 110 is formed to substantially have no movability, and is coupled with the bottom cover 150, and thus the liquid crystal panel 110 and the backlight unit 120 can be stably modulized.

Moreover, the second guide panel 220, to which the liquid crystal panel 110 is attached and fixed, is provided and formed to have a thickness less than that of the first guide panel 210, and thus the second guide panel 220 has movability to some extent compared with the first guide panel 210. Accordingly, the liquid crystal panel 110 has warpage and degree of freedom coping the shrinkage and expansion of the polarizing plates 119a and 119b using the second guide panel 220.

Accordingly, in case that the shrinkage and expansion of the polarizing plates 119a and 119b occurs, the shrinkage and expansion can be relieved through the second guide panel 220, and further damage on the liquid crystal panel 110 can be prevented.

Therefore, the liquid crystal panel 110 and the backlight unit 120 can be stably modulized, and damage on the liquid crystal panel 110 can be prevented.

Particularly, the rib 219 is formed at the end portion of the top surface of the first horizontal portion 213 of the first guide panel 210, and the rib groove 227, into which the rib 219 is inserted, is formed at the bottom surface, which is placed right on the top surface of the first horizontal portion 213, of the second horizontal portion 223 of the second guide panel 220, and thus light leakage can be prevented from occurring between the first and second guide panels 210 and 220.

In other words, in case that the shrinkage and expansion of the polarizing plates 119a and 119b occurs and the movement of the second guide panel 220 occurs in order to relieve the shrinkage and expansion, a gap between the first and second guide panels 210 and 220 may be produced, and this gap causes light leakage.

Accordingly, by forming the rib 219 and the rib groove 227 engaging each other at the location where the first and second guide panels 210 and 220 adheres to each other, the light leakage between the first and second guide panels 210 and 220 can be prevented. This is explained in more detail as below.

FIGS. 3A and 3B are schematic perspective views illustrating the guide panel of dual structure according to the embodiment of the present invention, and FIG. 3C is a schematic cross-sectional view illustrating a part of the first and second guide panels according to the embodiment of the present invention.

Referring to FIGS. 3A to 3C, the guide panel 200 includes the first guide panel 210 surrounding the peripheral portions of the backlight unit 120, and the second guide panel 220 surrounding the peripheral portions of the first guide panel 210.

The first guide panel 210 is made of mold material of synthetic resin such as polycarbonate, and includes the first vertical portion 211 surrounding the peripheral portions of the backlight unit 120, and the first horizontal portion 213 that protrudes into the inner direction perpendicularly from the first vertical portion 211.

The second coupling bump 215 protrudes from the outer surface of the first vertical portion 211, and the first coupling hole 217, into which the first coupling bump 155 is inserted, is formed at a lower portion of the second coupling bump 215.

The first coupling groove 216, into which the side surface 153 of the bottom cover 150 is inserted, is formed at the bottom surface of the first horizontal portion 213 i.e., a surface facing the bottom cover 150.

The rib 219 protrudes at the end portion of the top surface of the first horizontal portion 213 i.e., a surface facing the liquid crystal panel 110.

An end protrusion 219a is formed at the end of the first horizontal portion 213 due to the rib 219 protruding from the first horizontal portion 213.

The second guide panel 220 is also made of mold material of synthetic resin such as polycarbonate, and includes the second vertical portion 221 corresponding to the outer side surface of the first vertical portion 211 and the second horizontal portion 223 that protrudes into the inner direction perpendicularly from the second vertical portion 221 and corresponds to the first horizontal portion 211.

The second coupling hole 225, into which the second coupling bump 215 is inserted, is formed at the outer side surface of the second vertical portion 221, and the rib groove 227, into which the rib 219 is inserted, is formed at the bottom surface of the second horizontal portion 223 i.e., a surface facing the bottom cover 150.

Accordingly, in the guide panel 200 of dual structure, in order that the outer side surface of the first vertical portion 211 adheres to the inner side surface of the second vertical portion 221 and the top surface of the first horizontal portion 213 adheres to the bottom surface of the second horizontal portion 223, the first guide panel 210 is pushed from a bottom side to a top side and the second guide panel 220 is pushed from a top side to a bottom side, and thus the first and second guide panels 210 and 220 are assembled and coupled.

The second coupling bump 215 of the first vertical portion 211 is inserted into the second coupling hole 225 of the second vertical portion 223, and the rib 219 of the first horizontal portion 213 is inserted into the rib groove 227 of the second horizontal portion 223, and thus the first and second guide panels 210 and 220 are assembled and coupled.

The rib 219 of the first horizontal portion 213 is inserted into the rib groove 227 of the second horizontal portion 223, and thus the rib 219 and the groove 227 are configured to engage each other.

Accordingly, in case that the shrinkage and expansion of the polarizing plates 119a and 119b occurs and the movement of the second guide panel 220 occurs in order to relieve the shrinkage and expansion, even though a gap between the first and second guide panels 210 and 220 is produced, light leakage between the first and second guide panels 210 and 220 can be prevented.

It is preferred that the second horizontal portion 223 is formed to have a slant surface C at an end thereof, thus light emitted from the backlight unit 120 is not blocked by the end of the second horizontal portion 223 but is reflected by the slant surface C, and thus more light is supplied to the liquid crystal panel 110.

The protrusion end 229 formed at an end of the second horizontal portion 223 due to the rib groove 227 engages the end protrusion 219a of the first horizontal portion 213 when the rib 213 is inserted into the rib groove 227, and thus the second guide panel 220 can be prevented from moving along a X direction defined in the drawings.

It is preferred that the protrusion end 229 engaging the end protrusion 219a is treated to have a round shape such that particles due to grinding when they are engaging are not produced.

Moreover, in the guide panel 200, a second coupling groove 218 dent at a predetermined distance from the top surface of the first horizontal portion 213 is formed, and a coupling end 228 at the bottom surface of the second horizontal portion 223 and inserted into the second coupling groove 218 is formed.

Since the first horizontal portion 213 and the second horizontal portion 223 are configure to doubly engage each other using the second coupling groove 218 and the coupling end 228, the light leakage can be prevented more surely.

Moreover, using the second coupling groove 218 and the coupling end 228, assembling the first horizontal portion 211 and the second horizontal portion 221 is improved, and the movement of the second guide panel 220 can be prevented more surely.

Figure 4B:
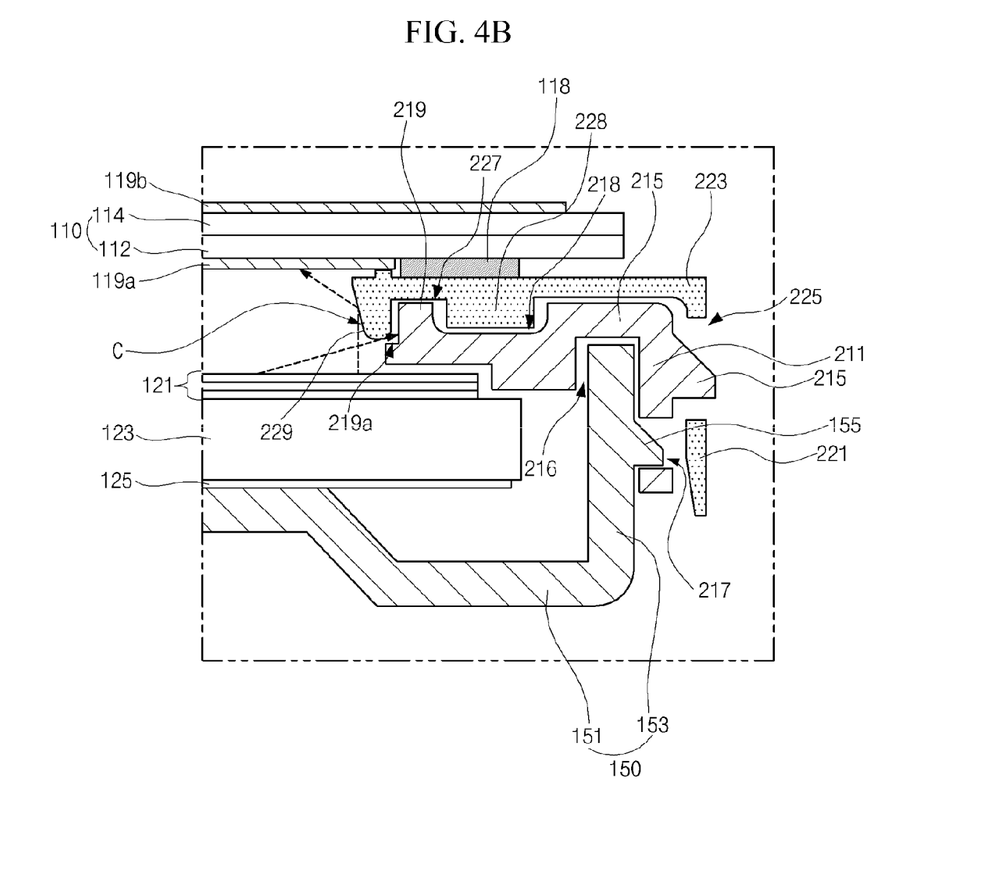
FIG. 4B is a cross-sectional view enlarging a part of FIG. 4A.

FIG. 4A is a cross-sectional view illustrating a part of the modulized LCD of FIG. 2, and FIG. 4B is a cross-sectional view enlarging a part of FIG. 4A.

Referring to FIGS. 4A and 4B, the backlight unit 120 includes the reflecting sheet 125, the light guide plate 123, the LED assembly 129 including the LEDs 129a and the PCB 129b having the LEDs 129a mounted thereon, and the optical sheets 121 on the light guide plate 123.

The liquid crystal panel 110 including the first and second substrates 112 and 114 and the liquid crystal layer therebetween is located on the backlight unit 120, and the polarizing plates 119a and 119b are attached onto the outer surfaces of the first and second substrates 112 and 114, respectively.

The liquid crystal panel 110 and the backlight unit 120 are modulized using the guide panel 200 of dual structure and the bottom cover 150. The backlight unit 120 is surrounded by the first vertical portion 211 of the first guide panel 210, and the backlight unit 120 surrounded by the first guide panel 210 is placed inside the side surface 153 of the bottom cover 150 and on the horizontal surface 151 of the bottom cover 150.

The liquid crystal panel 110 is placed on and supported by the second guide panel 220 that is assembled and coupled with the first guide panel 210.

In order that the outer side surface of the first vertical portion 211 adheres to the inner side surface of the second vertical portion 221 and the top surface of the first horizontal portion 213 adheres to the bottom surface of the second horizontal portion 223, the first guide panel 210 is pushed from a bottom side to a top side and the second guide panel 220 is pushed from a top side to a bottom side, and thus the first and second guide panels 210 and 220 are assembled and coupled.

The second coupling bump 215 of the first vertical portion 211 is inserted into the second coupling hole 225 of the second vertical portion 223, and the rib 219 of the first horizontal portion 213 is inserted into the rib groove 227 of the second horizontal portion 223, and thus the first and second guide panels 210 and 220 are assembled and coupled.

The coupled first and second guide panels 210 and 220 are coupled with the bottom cover 150. The inner side surface of the first vertical portion 211 adheres to the outer side surface of the side surface 153 of the bottom cover 150, and the first coupling bump 155 of the side surface 153 is inserted into the first coupling hole 217 of the first vertical portion 211.

The end of the side surface 153 of the bottom cover 150 is inserted into the coupling groove 216 of the bottom surface of the first horizontal portion 213, and the bottom cover 150 and the first guide panel 210 are assembled and coupled to each other.

Accordingly, the guide panel 200 of double structure and the bottom cover 150 are assembled and coupled to each other, and thus the liquid crystal panel 110 and the backlight unit 120 are unified and modulized.

Even though not shown in the drawings, the case top 140 is assembled and coupled with the guide panel 200 and the bottom cover 150 such that it covers one peripheral portion of the liquid crystal panel 110 at the front of the liquid crystal panel 110.

In the LCD of the embodiment, the guide panel 200 is configured to have the double-structure of the first and second guide panels 210 and 220, the first and second guide panels 210 and 220 are coupled with the bottom cover 150 using the first guide panel 210, and the liquid crystal panel 110 is attached and coupled using the second guide panel 220. Accordingly, the guide panel 200 of double structure and the bottom cover 150 can be coupled with stable coupling force, the shrinkage and expansion of the liquid crystal panel 110 due to the material property of the polarizing plates 19a and 119b can be relieved.

Moreover, the rib 219 is formed at the top surface of the first horizontal portion 213 of the first guide panel 210, and the rib groove 227, into which the rib 219 is inserted, is formed at the bottom surface of the second horizontal portion 223 of the second guide panel 220. Accordingly, in case that the shrinkage and expansion of the polarizing plates 119a and 119b occurs and the movement of the second guide panel 220 occurs in order to relieve the shrinkage and expansion, even though a gap between the first and second guide panels 210 and 220 may be produced, the light leakage between the first and second guide panels 210 and 220 can be prevented.

Moreover, the second horizontal portion 223 is formed to have the slant surface C at an end thereof, thus light emitted from the backlight unit 120 is not blocked by the end of the second horizontal portion 223 but is reflected by the slant surface C, and thus more light is supplied to the liquid crystal panel 110.

Moreover, in the guide panel 200, the second coupling groove 218 is formed at the top surface of the first horizontal portion 213 of the first guide panel 210, and the coupling end 228, into which the second coupling groove 218 is inserted, is formed at the bottom surface of the second horizontal portion 223 of the second guide panel 220, and thus the light leakage between the first and second guide panels 210 and 220 can be prevented more surely.

In the LCD of the embodiment as described above, the guide panel 200 is configured to have the double-structure of the first and second guide panels 210 and 220, the first and second guide panels 210 and 220 are coupled with the bottom cover 150 using the first guide panel 210, and the liquid crystal panel 110 is attached and coupled using the second guide panel 220. Accordingly, the guide panel 200 of double structure and the bottom cover 150 can be coupled with stable coupling force, the shrinkage and expansion of the liquid crystal panel 110 due to the material property of the polarizing plates 119a and 119b can be relieved.

Accordingly, damage on the liquid crystal panel can be prevented. The rib 219 is formed at the top surface of the first horizontal portion 213 of the first guide panel 210, and the rib groove 227, into which the rib 219 is inserted, is formed at the bottom surface of the second horizontal portion 223 of the second guide panel 220. Accordingly, in case that the shrinkage and expansion of the polarizing plates 119a and 119b occurs and the movement of the second guide panel 220 occurs in order to relieve the shrinkage and expansion, even though a gap between the first and second guide panels 210 and 220 may be produced, the light leakage between the first and second guide panels 210 and 220 can be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first guide panel coupled with a bottom cover, the first guide panel including:
a first vertical portion surrounding peripheral portions of a backlight unit, and
a first horizontal portion that protrudes perpendicularly away from an inner side of the first vertical portion, a rib protruding perpendicularly to the first horizontal portion at a top surface of the first horizontal portion; and
a second guide panel including:
a second vertical portion which is placed on and coupled to an outer side surface of the first vertical portion, and
a second horizontal portion which protrudes perpendicularly away from an inner side of the second vertical portion, a liquid crystal panel attached to a top surface of the second horizontal portion, the second horizontal portion having a protrusion end opposite from the second vertical portion, the protrusion end having a slanted surface, the protrusion end extending downward from the second horizontal portion to form a rib groove with a bottom surface of the second horizontal portion, the rib inserted into the rib groove.

2. The device according to claim 1, wherein a first coupling bump is formed at a side surface of the bottom cover, and the first vertical portion is placed on an outer side surface of the side surface of the bottom cover and includes a first coupling hole into which the first coupling bump is inserted.

3. The device according to claim 1, wherein a second coupling bump is formed at an outer surface of the first vertical portion, and a second coupling hole, into which the second coupling bump is inserted, is formed at the second vertical portion.

4. The device according to claim 1, wherein a bottom of the protrusion end has a round shape.

5. The device according to claim 4, wherein the first horizontal protrusion includes an end protrusion extending away from the rib, the end protrusion of the first horizontal portion extending below the protrusion end of the second horizontal portion.

6. The device according to claim 1, wherein a coupling groove is formed in the first horizontal portion by an inward side of the rib and the top surface of the first horizontal portion, and the second horizontal portion includes a coupling end formed at a bottom surface of the second horizontal portion, the coupling end of the second horizontal portion inserted into the coupling groove formed in the first horizontal portion.

7. The device according to claim 1, wherein a first coupling groove, into which a side surface of the bottom cover is inserted, is formed by the first vertical portion and a bottom surface of the first horizontal portion.

8. The device according to claim 1, wherein a thickness of the second guide panel is less than a thickness of the first guide panel.

9. The device according to claim 1, wherein the liquid crystal panel is attached to the top surface of the second horizontal portion using an adhesive pad that includes double-sided tape.

10. The device according to claim 1, wherein the backlight unit includes an LED assembly, a light guide plate, and an optical sheet.

11. The device according to claim 1, wherein the rib and rib groove engage each other below a location where the liquid crystal panel is attached to the top surface of the second horizontal portion.

12. The device according to claim 1, wherein the rib protrudes from the first horizontal portion toward the liquid crystal panel.

13. A liquid crystal display device comprising:
a liquid crystal panel;
a backlight unit below the liquid crystal panel;
a bottom cover including a horizontal surface, on which the liquid crystal panel and the backlight unit are placed, and a side surface perpendicular to the horizontal surface;
a first guide panel coupled with the bottom cover, the first guide panel including:
a first vertical portion surrounding peripheral portions of the backlight unit, and
a first horizontal portion that protrudes perpendicularly away from an inner side of the first vertical portion, a rib protruding perpendicularly to the first horizontal portion at a top surface of the first horizontal portion; and
a second guide panel including:
a second vertical portion which is placed on and coupled to an outer side surface of the first vertical portion, and
a second horizontal portion which protrudes perpendicularly away from an inner side of the second vertical portion, the liquid crystal panel attached to a top surface of the second horizontal portion, the second horizontal portion having a protrusion end opposite from the second vertical portion, the protrusion end having a slanted surface that reflects light emitted by the backlight unit to supply the reflected light to the liquid crystal panel, the protrusion end extending downward from the second horizontal portion to form a rib groove with a bottom surface of the second horizontal portion, the rib inserted into the rib groove.

* * * * *